(12) United States Patent
Ota et al.

(10) Patent No.: US 8,355,634 B2
(45) Date of Patent: Jan. 15, 2013

(54) OPTICAL NETWORK UNIT HAVING AUTOMATIC SHUTDOWN

(75) Inventors: Yusuke Ota, Mountain Lakes, NJ (US); Wilhelm C. Fischer, Berkeley Heights, NJ (US)

(73) Assignee: Go! Foton Holding, Inc., Somerset, NJ (US)

( * ) Notice: Subject to any disclaimer, the term of this patent is extended or adjusted under 35 U.S.C. 154(b) by 741 days.

(21) Appl. No.: 12/583,433

(22) Filed: Aug. 20, 2009

(65) Prior Publication Data
US 2011/0044685 A1    Feb. 24, 2011

(51) Int. Cl.
*H04J 14/00* (2006.01)
(52) U.S. Cl. .................. 398/75; 398/66; 398/70
(58) Field of Classification Search .......... 398/15–19, 398/38, 66–75
See application file for complete search history.

(56) References Cited

U.S. PATENT DOCUMENTS

| | | | |
|---|---|---|---|
| 6,108,112 A | 8/2000 | Touma | 359/110 |
| 6,504,630 B1 | 1/2003 | Czarnocha et al. | 359/110 |
| 2003/0025965 A1* | 2/2003 | Takatsu et al. | 359/124 |
| 2008/0166119 A1* | 7/2008 | Ryu et al. | 398/17 |
| 2011/0214160 A1* | 9/2011 | Costa et al. | 726/3 |

* cited by examiner

*Primary Examiner* — Dzung Tran
(74) *Attorney, Agent, or Firm* — Ernest D. Buff; Ernest D. Buff & Assoc. LLC.

(57) ABSTRACT

An optical network unit useful in a passive optical network has capability for automatic shutdown upon detection of a malfunction, thereby protecting the integrity of upstream data transmitted in the network. The unit detects the generation of upstream light during intervals in which transmission is not authorized. In response, the light source of the unit is deactivated to prevent collisions with upstream data from other optical network units in the network.

18 Claims, 9 Drawing Sheets

OPTICAL NETWORK UNIT HAVING AUTOMATIC SHUTDOWN

BACKGROUND OF THE INVENTION

1. Field of the Invention

The present invention relates to a passive optical network system; and more particularly to a passive optical network system employing optical network units having capability for automatic shutdown upon the detection of a malfunction, and a method for the use thereof.

2. Description of Related Art

In a typically-used form of a passive optical network (PON) system with multiple optical network units (ONUs), the transmitter (TX) of each ONU is precisely controlled by an optical line termination (OLT) unit located in a central office. The precise control is frequently provided in accordance with a protocol known as time division multiplex access, or TDMA, which allocates particular time slices for each ONU to transmit. A control protocol such as TDMA is required to avoid collision between data packets that would occur if different ONUs were to transmit simultaneously in the upstream channel. However, under certain fault conditions, an ONU can fail in such a way that it inadvertently continues to transmit during TDMA time slices in which that ONU is not authorized to transmit. The errant ONU thus compromises the entire upstream data traffic to a given OLT, because the integrity of the data from the various ONUs can no longer be assured. Thus, there exists a long-felt and unmet need in the art for a system, method, or apparatus capable of detecting such malfunctions of an ONU TX, so that corrective action can be taken.

SUMMARY OF THE INVENTION

The present invention relates to methods, systems and apparatus for optical fiber communication. In an aspect of the invention there is provided an optical network unit (ONU) having the capability for automatic shutdown upon the detection of a malfunction. The ONU is useful in the implementation of a passive optical network in which a plurality of ONUs are optically connected to central office equipment for bi-directional data communications and the central office provides control specifying for each of the ONUs time slices during which the ONU is authorized to transmit upstream data. The ONU comprises: (i) a driver circuit adapted to drive a light source in response to upstream data received at a digital data input, and further having frame and shutdown inputs; (ii) a light source, such as a laser diode, connected to the driver circuit and configured to generate an upstream optical signal having an upstream optical power level and representative of the upstream data received at the digital data input for transmission from the optical network unit to the central office equipment; (iii) an authorization circuit responsive to the control to form an ON frame state signal during time slices in which transmission of the upstream optical signal from the ONU is authorized and an OFF frame state signal during time slices in which the transmission of the upstream optical signal is prohibited; (iv) a monitoring circuit operable to monitor the upstream optical power level; (v) a comparison circuit connected to the monitoring circuit and operable to compare the upstream optical power level to a predetermined threshold power level and generate: (a) an ON monitor state signal while the upstream optical power level exceeds the predetermined threshold power level; and (b) an OFF monitor state signal while the upstream optical power level is lower than the predetermined threshold power level; and (vi) a deactivation circuit connected to the authorization and comparison circuits and operable to detect the presence of the ON monitor state signal received from the comparison circuit in coincidence with presence of the ON frame state signal received from the authorization circuit and, in response, to output a shutdown signal. The driver circuit is connected at the frame input to the authorization circuit and at the shutdown input to the deactivation circuit. The driver circuit is configured to: (a) drive the light source to transmit the upstream data while the frame state signal is ON and the shutdown signal is not present; (b) inhibit the light source while the frame state signal is OFF; and (c) deactivate the light source upon receipt of the shutdown signal.

Another aspect provides a method of deactivating a faulty ONU in a PON in which a plurality of optical network units are optically connected to central office equipment for bi-directional data communications. Each ONU is configured to transmit upstream optical data using a light source and to receive control from the central office specifying time slices during which transmission of upstream data from that ONU is authorized. The method comprises the steps of: (i) forming a frame state signal in response to the control, the frame state signal having an ON value during time slices in which transmission of upstream data from the ONU is authorized and an OFF value during time slices in which the transmission of upstream data is prohibited; (ii) monitoring a power level of the upstream transmission; (iii) comparing the power level to a predetermined threshold power level. In response to detection of an upstream power level in excess of the threshold power level in coincidence with the frame state signal being in the OFF state, the light source is deactivated, whereby the faulty ONU is deactivated and prevented from compromising the data integrity of the PON.

Also provided is an improved PON, wherein at least one of the ONUs is of the type set forth above and capable of shutting itself down automatically in case of an operating fault condition.

BRIEF DESCRIPTION OF THE DRAWINGS

The invention will be more fully understood and further advantages will become apparent when reference is had to the following detailed description of the preferred embodiments of the invention and the accompanying drawings, wherein like reference numeral denote similar elements throughout the several views and in which.

DESCRIPTION OF THE PREFERRED EMBODIMENTS

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. The various processes and functions described herein may either be part of the micro instruction code or part of the application program (or a combination thereof) which is executed via the operating system. In addition, various other peripheral devices may be connected to the computer platform such as an additional data storage device and a printing device, It is to be further understood that, because some of the constituent system components and method steps depicted in the accompanying figures may be implemented in various hardware and software forms, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 1:
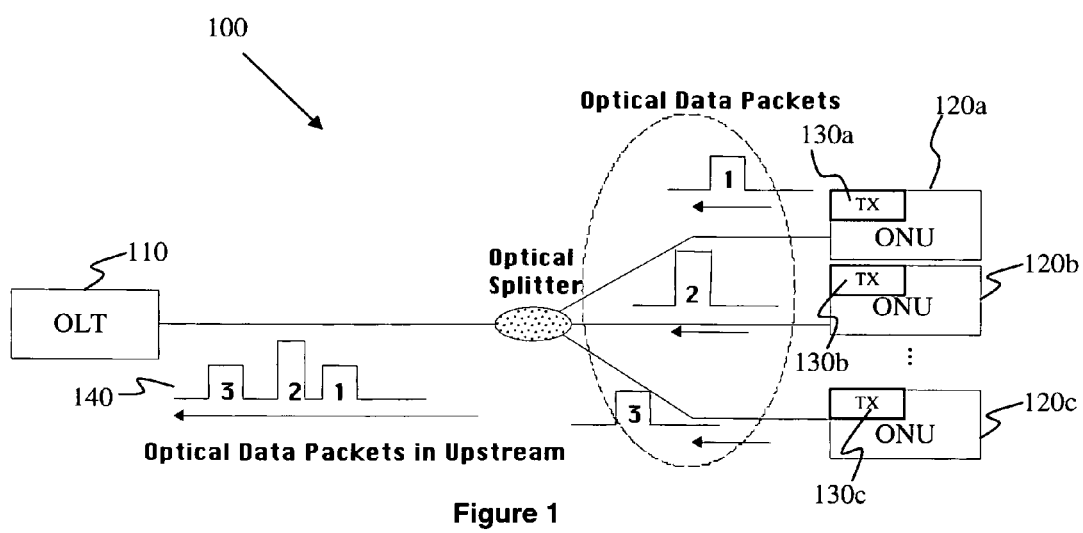
FIG. 1 is a schematic depiction of a conventional PON under normal operation.

FIG. 1 depicts an exemplary prior art PON system 100 with multiple ONU 120*a*, 120*b* 120*c* that include respective transmitters 130*a*, 130*b*, 130*c*. (For simplicity of illustration, PON system 100 is shown as servicing three ONUs from OLT 110 located at a central office, but it should be understood that actual installations can entail service of a number ONUs ranging as high as 256 or more per OLT.) During normal operation, the transmitters respectively transmit packets (schematically depicted as packets 1, 2, 3 in FIG. 1) during distinct time slices allocated in accordance with a TDMA protocol. A media access control (MAC) system associated with each ONU clears the TX of that ONU to transmit, but only during allocated time slices. Precision control is required to avoid collision between upstream data packets 140.

However, certain failure modes of an ONU transmitter can have seriously adverse consequences. At one extreme, if a malfunctioning TX stops transmitting altogether, only that TX's ONU and the end-user devices connected to it are incapacitated, and there is, at worst, only a minor effect on the overall PON 100. In such situations, the need for immediate amelioration of the problem may not be urgent. However, far more serious consequences arise in the situation depicted by FIG. 2, which is a diagram indicating generally at 200 the same PON system depicted in FIG. 1, but with one of its ONUs malfunctioning. In this condition, TX 230*x* of ONU 220*x* is transmitting optical power 1*x* indiscriminately, without regard to sequencing commands from OLT 110, while TXs 130*b*, 130*c* nominally continue to honor the sequencing protocol, transmitting packets 2 and 3 as directed. Whether TX 230*x* is in a constantly-on condition or is generating random noise, its optical output 1*x* overlaps with legitimate packets 2 and 3, as depicted by the packets identified by reference numeral 240, compromising the network and rendering the entire PON system 200 unstable.

Accordingly, the problem of detection, identification, and remediation of a malfunctioning ONU TX is very important. In addition, due to the nature of a PON system, when upstream communication is interrupted, it is difficult to identify which malfunctioning ONU is responsible. Even if the malfunctioning transmitter can readily be identified, it might not be immediately accessible for repair or replacement. One remedy, in accordance with the present invention, for the malfunctioning PON system 100 is to force the TX 230*x* of the ONU 220*x* to shut down.

Figure 3:
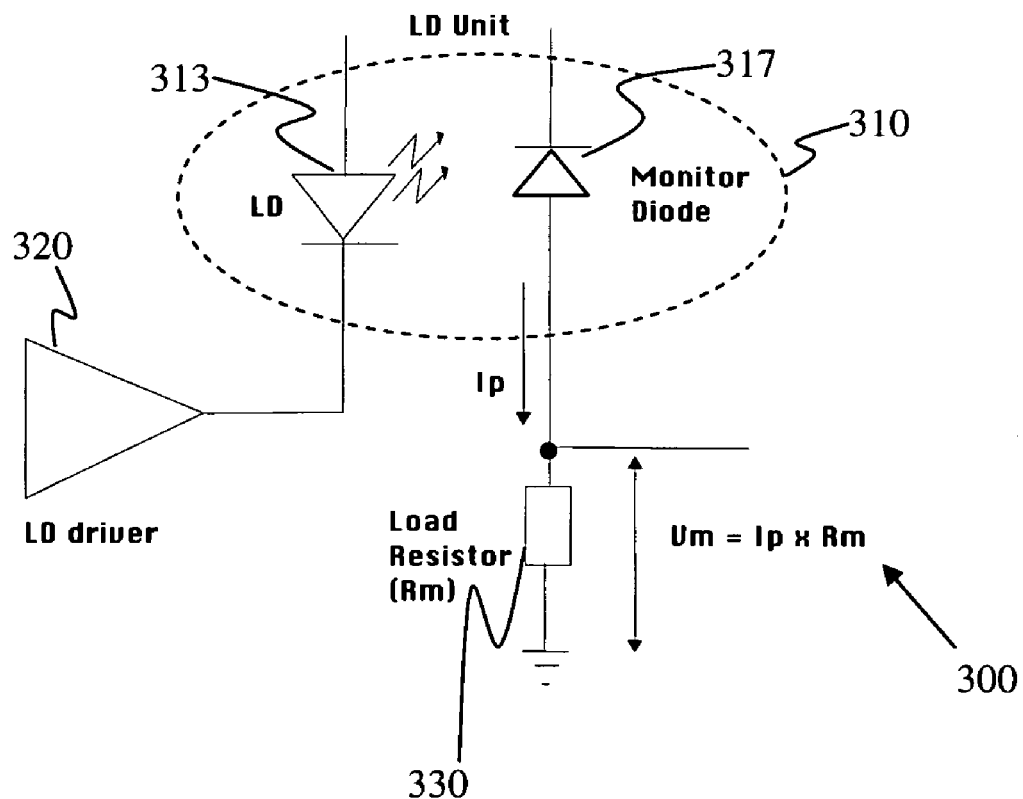
FIG. 3 is a schematic diagram of an exemplary transmitter TX in accordance with the present invention.

FIG. 3 depicts generally at 300 a portion of a TX configured in accordance with the present invention. It comprises a light source, such as laser diode (LD) unit 310, which, in the depicted embodiment, is formed using a laser diode (LD) 313 and a monitoring photodiode (PD) 317. Also included are a laser diode driver circuit 320 and a load resistor 330 (Rm). The depicted LD unit 310 can be used, in accordance with the present invention, for detecting abnormal transmission behavior of a malfunctioning ONU TX. In the depicted embodiment this is accomplished by monitoring light source LD 313 using PD 317 as an optical energy detector/monitor. In the depicted embodiment, light is generated by current flow through LD 313. A proportionate amount of the light impinges on monitor PD 317, causing a photocurrent (Ip) to flow in a circuit in which PD 317 is connected through load resistor Rm 330, resulting in a monitor voltage drop Vm that is indicative of the actual optical power generated.

Figure 4:
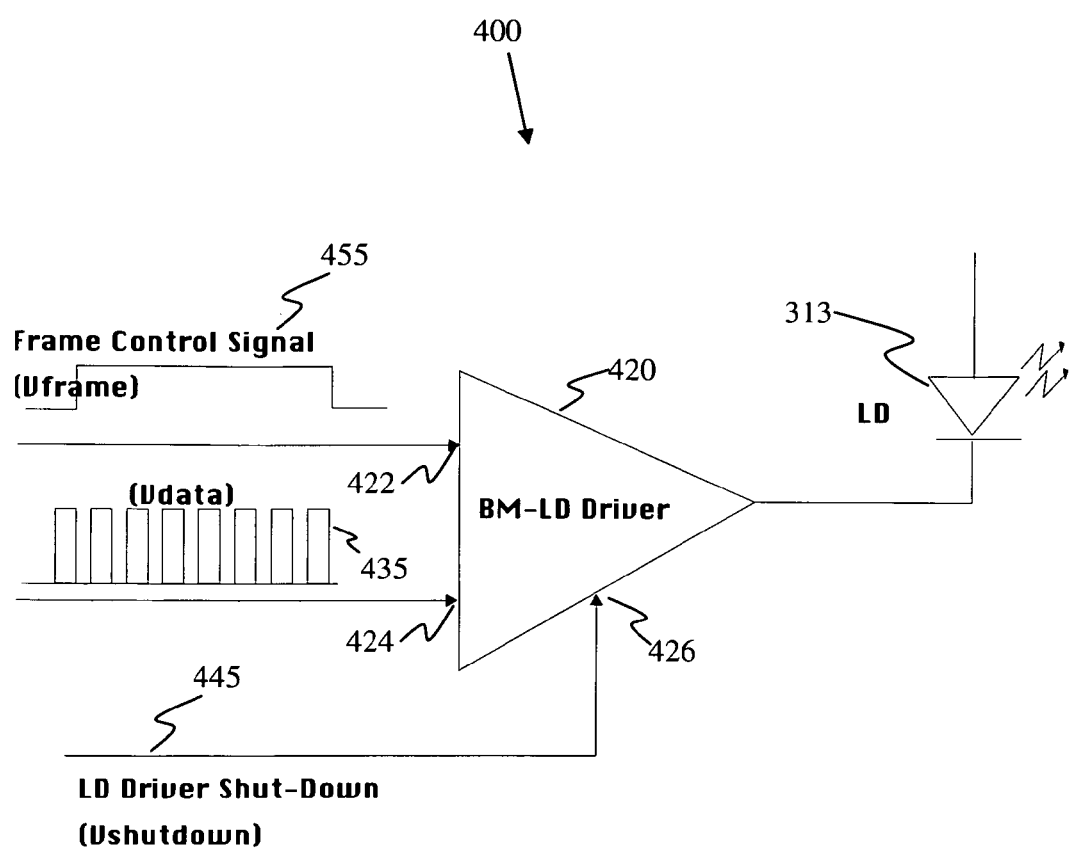
FIG. 4 is a schematic diagram of an exemplary burst-mode laser diode driver system, in accordance with the present invention.

FIG. 4 depicts generally at 400 an exemplary, high-level schematic view of a LD driver circuit useful in the present system and method. The circuit is part of an ONU and includes a laser diode driver 420 operable to drive LD 313 to generate light pulses in burst mode (BM) bearing digital data for upstream transmission via optical fiber to OLT 110. The depicted BM LD driver 420 has three inputs: digital data signal input 424, frame control input 422, and a LD driver shutdown input 426. The digital data input 424 receives signal 435, which represents the data to be uploaded. (It will be understood that for simplicity of illustration, signal 435 is shown schematically in FIGS. 4 and 5 as a featureless series of regular pulses, whereas any actual signal stream processed through the ONU will, of course, be a series of varying bits encoding actual data.) The frame control input 422 receives frame state signal 425 from an authorization circuit, such as an ONU Media Access Controller (MAC) associated with that ONU, which operates in response to commands coming from OLT 110 of PON 100. In one possible implementation, a frame signal ON state corresponds to a logic "HI" frame state signal (Vframe) 455, that allows LD 313 to transmit. The frame state signal OFF state corresponds to a logic LO value for Vframe. In this state, transmission from LD 313 is inhibited. The LD driver shut-down signal 445 provides an override function used only for emergencies, e.g. when the LD driver circuit 400 must be forcibly shut down to maintain network integrity. In a possible implementation, LD driver circuit 400 is shut down whenever driver shutdown signal 445 is logic "HI." For example, the presence of a HI driver shutdown signal may trigger circuitry limiting the current supplied by driver 420 to LD 313 or interrupting its power supply altogether. Other control possibilities may also be implemented to suppress output from LD 313 in response to a shutdown signal.

Figure 5A:
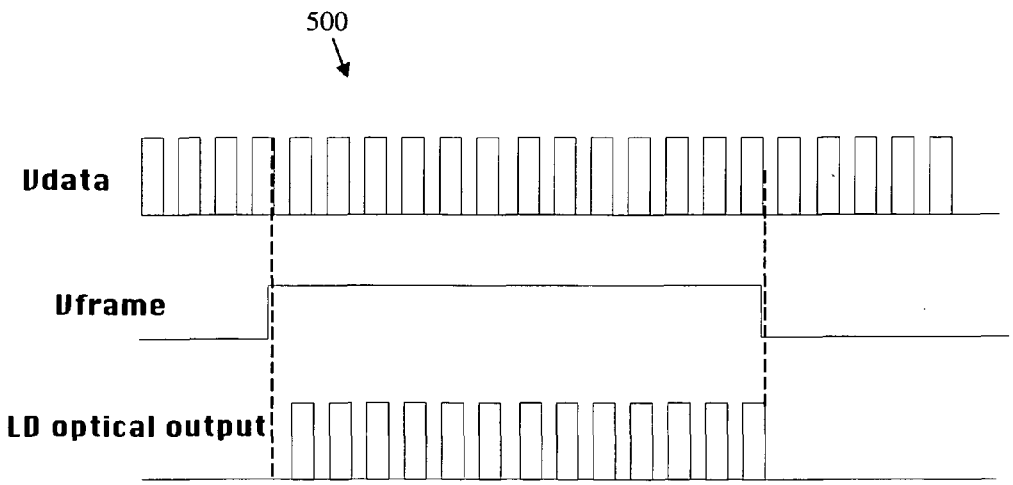
FIG. 5A is an exemplary depiction of signals generated during nominal operation of an ONU TX.

Referring now to FIG. 5A, relevant signals extant during the nominal operation of PON 100 are depicted generally at 500. The Vframe logic signal controls the output of data signal Vdata, permitting optical output only when Vframe is HI; otherwise, generation of output data is inhibited.

Figure 2:
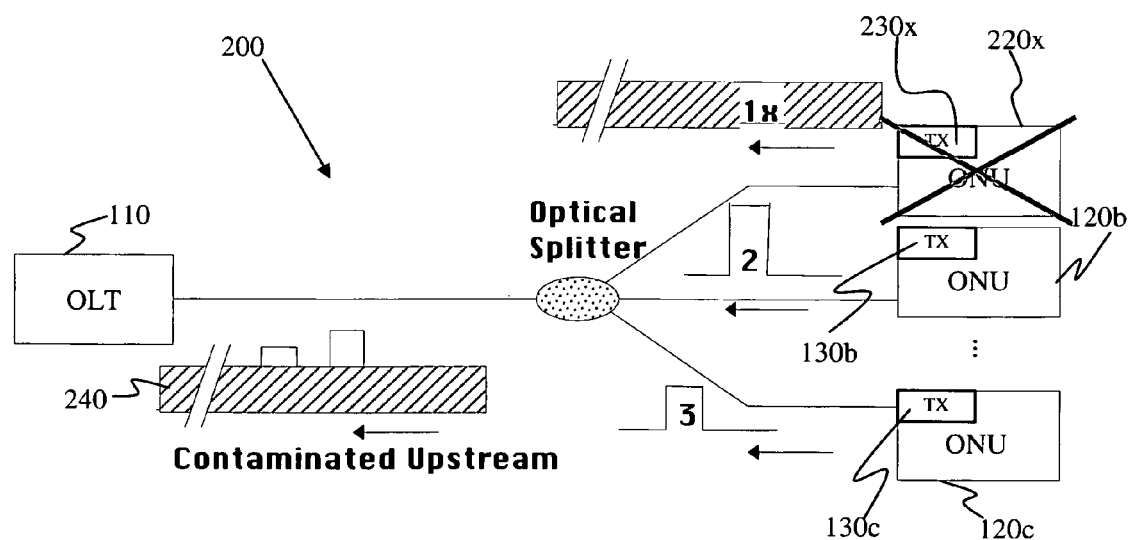
FIG. 2 is a schematic depiction of a conventional PON that is malfunctioning.
Figure 5B:
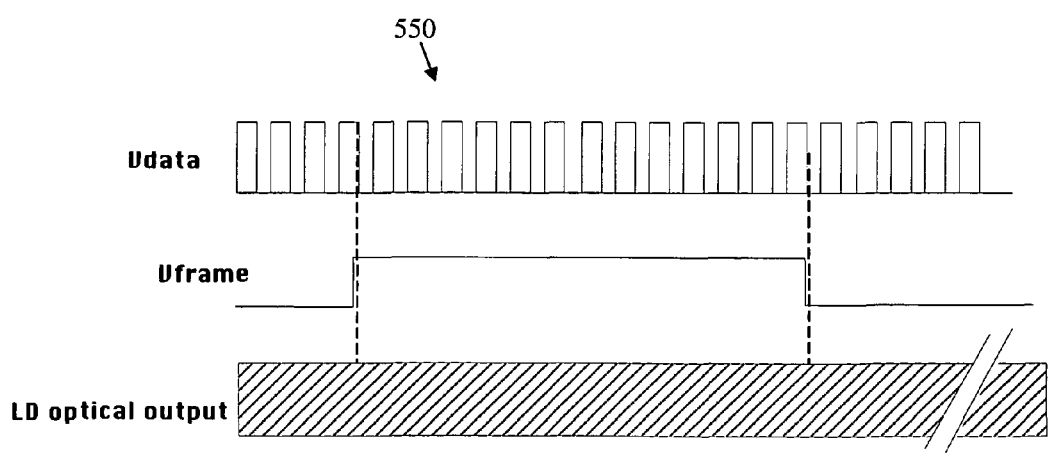
FIG. 5B is an exemplary depiction of signals generated during abnormal operation of an ONU TX.

During a malfunction of the LD control system of an ONU TX, the Vframe logic signal can fail to control the optical power emission from the LD 313. In one possible failure mode, the LD 313 emits optical noise, regardless of the Vdata or Vframe input values. A failure mode also might result in continuous output of light. FIG. 5B depicts an exemplary situation when the PON 200 of FIG. 2 is operating abnormally because of a malfunctioning ONU TX unit. When such a situation occurs, the entire PON system is essentially "out of order" until the malfunctioning ONU TX can be shut down, repaired, or replaced.

There are four possible conditions that may occur during operation of an exemplary BM TX of the present system:
1) Vframe is HI and optical transmission is present (Vmonitor Shows Voltage)
2) Vframe is HI and optical transmission is absent (Vmonitor is Zero)
3) Vframe is LO and optical transmission is absent (Vmonitor is Zero)
4) Vframe is LO and Optical transmission is present (Vmonitor shows voltage).

Conditions (1)-(3) all represent normal operation of the ONU. But if the TX is operating in condition (4), it necessarily indicates that the ONU TX is malfunctioning. In essence, the Vframe signal is unable to control the BM TX driver and the ONU TX continues to transmit optical power regardless of the Vframe command. Thus, the associated TX must be forced to shut down. In an implementation, the third input to driver, labeled Vshutdown, is used to provide this control. Setting Vshutdown to logic HI triggers the deactivation circuit to disable the TX system by preventing LD 313 from emitting light. Truth Table I, below, summarizes the foregoing operation of the ONU TX in terms of combinatorial logic and specifies the calculation of the Vshutdown logical state that implements the automatic shutdown of the present system.

TRUTH TABLE I

| Condition | Vframe | Vmonitor | Vshutdown | Comment |
|---|---|---|---|---|
| 1 | HI | HI | LO | Normal operation |
| 2 | HI | LO | LO | Normal operation |
| 3 | LO | LO | LO | Normal operation |
| 4 | LO | HI | HI | Abnormal operation - TX must be shut down |

Though the four operational conditions are discussed herein with regard to an ONU transmitter configuration that comprises BM TX circuitry, one of ordinary skill in the art should be able to apply the same logic and operational modes to any type of transmitter that is found within an ONU. In addition, the present system and method are shown with particular HI and LO logic signal levels associated with particular states of the various circuits. The system and method disclosed herein can alternatively be implemented such that the logic signal levels associated with any or all of these states are inverted.

Figure 6:
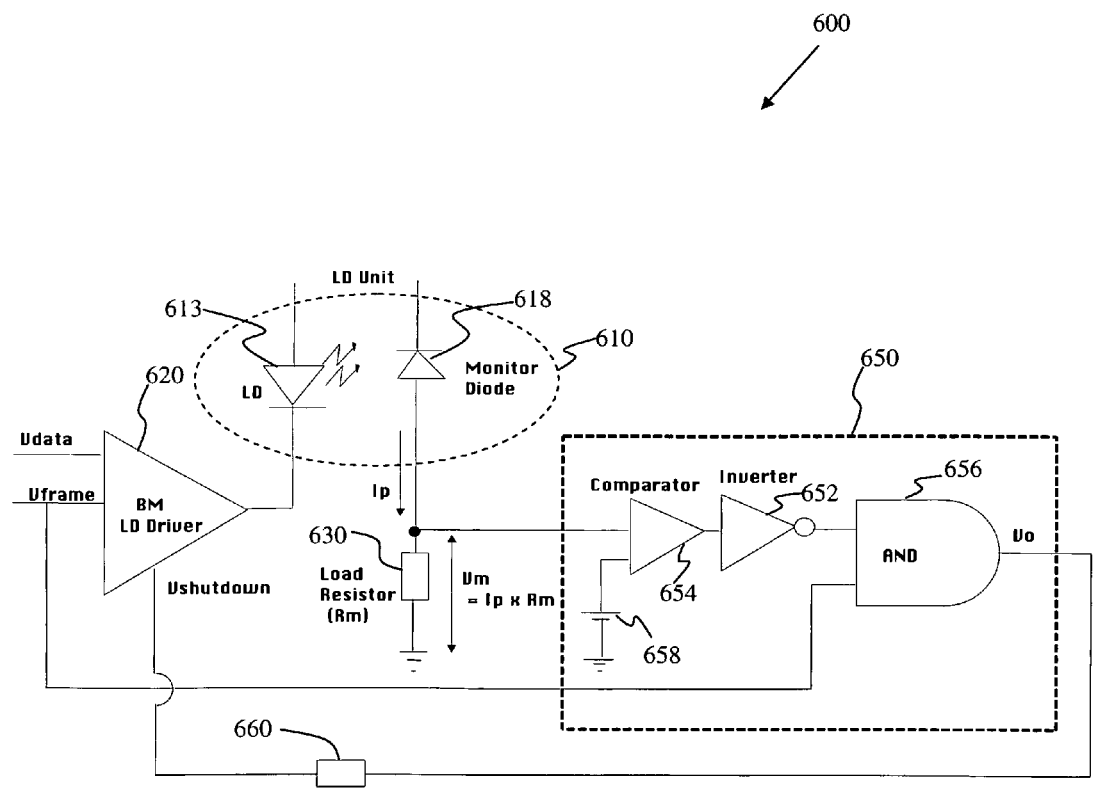
FIG. 6 is a schematic diagram of an exemplary embodiment, of an ONU TX comprising an automatic safety shutdown protection circuit, in accordance with the present invention.

FIG. 6 illustrates an exemplary automatic shutdown circuit 650 used in the present system and method to detect the aforementioned fault condition and generate a signal Vo used to automatically disable ONU TX 600. The shutdown circuit 650 works in concert with the remaining exemplary TX circuitry 600, which also comprises a LD Unit 610 with a corresponding Laser Diode 613 and a monitoring photodiode 618. Also included are the BM LD Driver 620 and a Load Resistor 630. The shutdown circuit 650 comprises (i) a comparison circuit, including a voltage reference 658 and a comparator 654, and (ii) a deactivation circuit, including an inverter 652 and an AND gate 656 logic circuits. It should be noted that the ONU TX 600 circuitry is schematically depicted in FIG. 6. One of ordinary skill in the art will recognize that addition, or subtraction, of components and circuitry might be required to create a fully operational embodiment. However, these added or removed components do not necessarily take away from the invention described herein, which will still read on these "operational" embodiments.

The series connection of load resistor 630 to photodiode 618 provides monitoring circuitry that enables monitoring and measurement of the actual power output of LD 613. Voltage drop Vm, taken across load resistor 630, is converted to the appropriate combinatorial logic level by a comparator 654, which compares Vm with a reference voltage Vref produced by source 658. Vref is preselected to be indicative of a preselected threshold power level incident on monitoring photodiode 618. The comparator output of comparator 654 provides an ON monitor state signal while Vm exceeds Vref, indicating that the upstream optical power level exceeds the predetermined threshold power level and an OFF monitor state signal while Vref exceeds Vm. This ON/OFF signal is then inverted by an inverter 652 and fed to one of inputs of an AND gate 656. The Vframe signal, conditioned to be compatible with the signal levels associated with the logic family in which the FIG. 6 circuit is implemented, is fed into the other input port of AND gate 656. The output of AND gate 656, Vo, is connected to the Vshutdown input of the BM LD Driver 620 through source resistor 660. This connection provides feedback that enables the TX 600 to be disabled when a malfunction like that described hereinabove in connection with FIG. 2. Preferably, both the monitoring and comparison circuits operate continuously. It will be understood that the logic circuitry of FIG. 6 may be implemented using circuits of any suitable logic family, including TTL, CMOS, and other known types.

Figure 7:
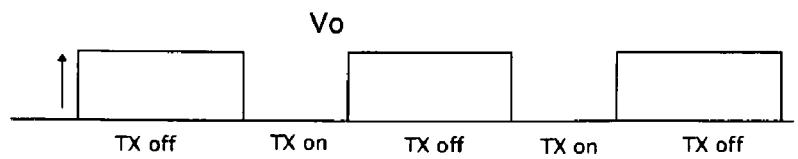
FIG. 7 is schematic depiction of signals encountered during a malfunction condition in the practice of the present method and system.

It is found that the implementation depicted by FIG. 6 is somewhat prone to an oscillation in which the ONU alternates in and out of shutdown mode. Once a shutdown signal is received and the LD emission is deactivated, the monitor power level drops to zero, of course, so that Condition (4) in Truth Table I is no longer extant, removing the shutdown signal, and allowing LD 613 to again attempt to send data. If the ONU remains in fault condition and fails to respond to Vframe control, Condition (4) again exists, causing the shutdown signal to be activated. This oscillatory condition is shown schematically in FIG. 7, showing the Vo signal output by circuit 650 alternating in time between logic LO and HI states. It is believed the frequency of this oscillation is controlled largely by the turn-on time for the laser driver circuit, which in typical commercial units is of the order 200-500 μs, leading to an oscillation at a few kHz. One expedient is to include a low-pass filter circuit element that includes one or more reactive components, such as a capacitor of suitable value, in the input to comparison circuit 650, producing a time constant sufficiently larger than the laser driver turn-on time, which largely suppresses any tendency to this oscillation. With the addition of such an element, the measured voltage drop becomes representative of an average power level of the light source.

A preferred alternative is to include additional latching circuitry in the Vshutdown feedback loop. Upon receiving indication of Condition (4), the latching circuit causes the Vshutdown signal to be raised and held until a reset operation is performed, such as by cold-starting the ONU. The ONU also might be provided with a manual reset button or switch to permit an attempted restart.

Figure 8:
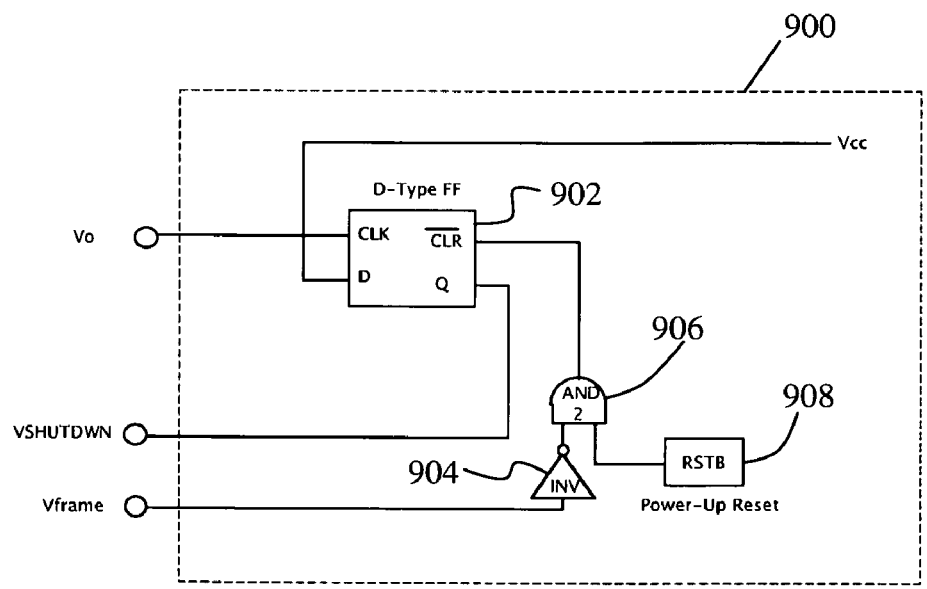
FIG. 8 is a schematic diagram of a latching circuit useful in the practice of the present method and system.

A possible implementation of a latching circuit 900 that may be included in the present deactivation circuit is depicted in FIG. 8. After start-up, the operation of circuit 900 is controlled by inputs Vo and Vframe. Circuit 900 includes a power-up reset circuit RSTB 908 and conventional D-type flip-flop 902, inverter 904, and AND gate 906 logic circuits. Vo is provided from the output of AND gate 656, as shown in FIG. 6. At power-up of the ONU, power supply voltage Vcc rises relatively slowly to its assigned value (chosen in accordance with the logic family used in the ONU circuitry), placing the system in operating condition. However, the RSTB output stays LO for some interval. During this time the output of AND gate 906 is forced LO, resetting flip-flop 902 and readying it for operation. Thereafter, when the CLK input of flip-flop 902 encounters a rising edge of Vo, the data signal D is connected to Vcc=HI, so that the Q output, which provides Vshutdown, is latched permanently HI (=Vcc). This voltage overrides any signal from Vo because of Rs included in the FIG. 6 circuit. When Vframe is HI, Vo is always LO.

Figure 9:
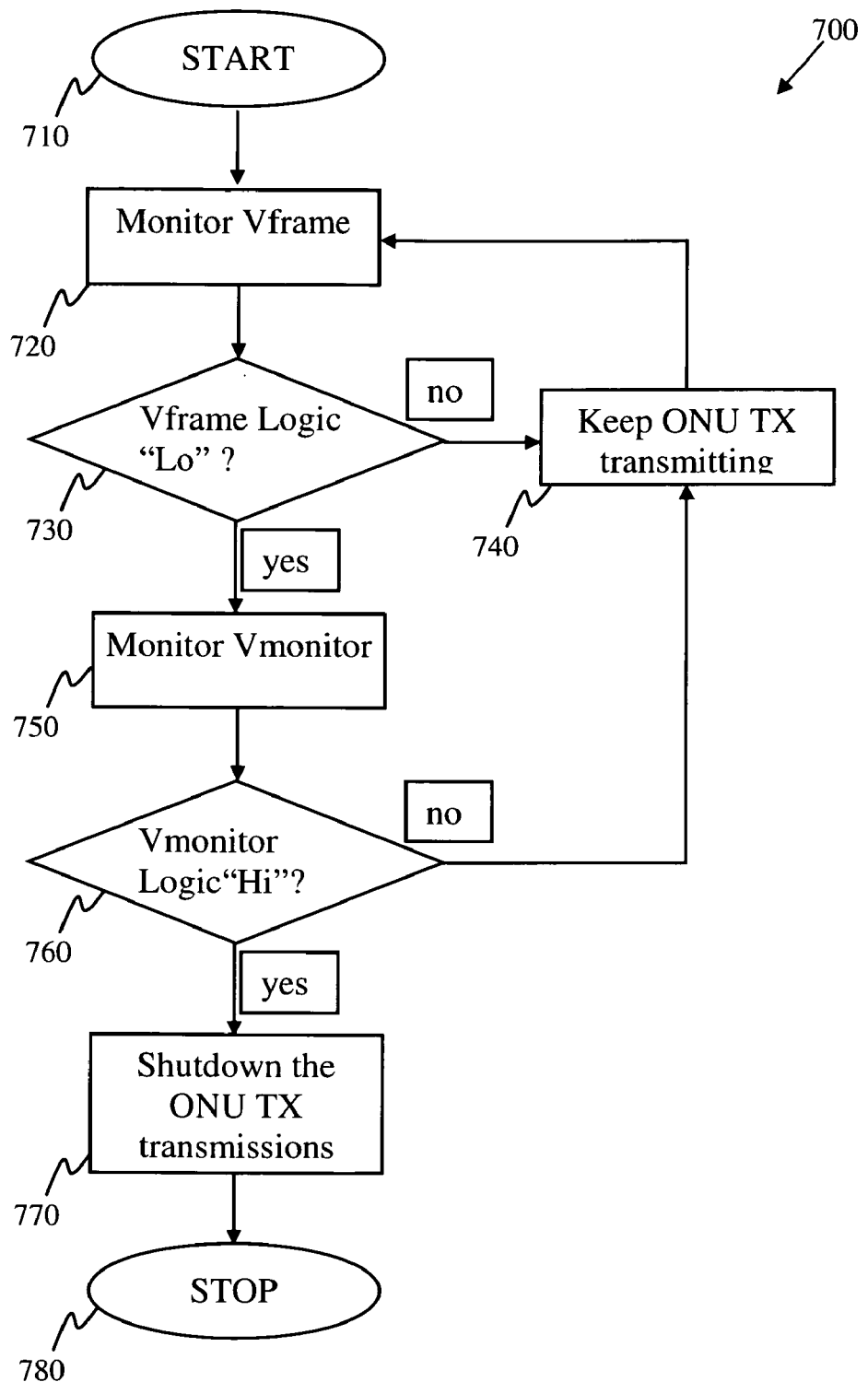
FIG. 9 is a flow diagram depicting a process in accordance with the present invention.
Figure 10:
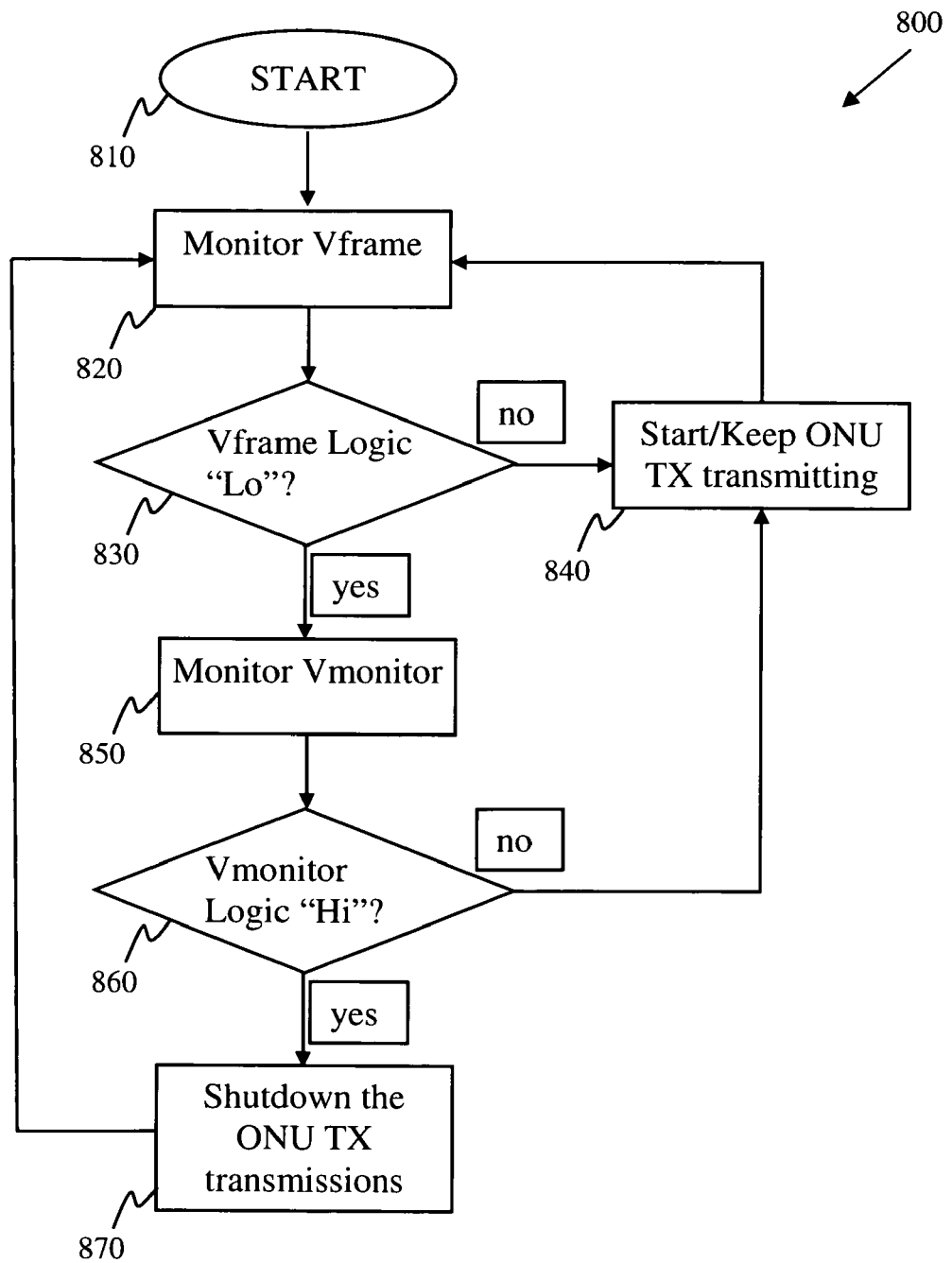
FIG. 10 is a flow diagram depicting a process in accordance with the present invention.

FIGS. 9 and 10 are flowcharts that depict some exemplary processes, in accordance with the present invention, that can be, in part, practiced with the components described herein to provide shutdown of a malfunctioning ONU. FIG. 9 depicts an exemplary process that automatically shuts down and indefinitely suspends transmission by the ONU upon the occurrence of a malfunction that results in transmission outside the time slices permitted by the TDMA protocol. On the other hand, FIG. 8 depicts an exemplary process wherein the ONU's transmission can be automatically restarted if the malfunction is somehow removed.

Blocks 710 and 810 are starting blocks that indicate the beginning of the process. Blocks 720, 750 and 820, 850 depict steps of monitoring the Vframe and Vmonitor signals. Blocks 730, 760 and 830, 860 are decision blocks that indicate the appropriate response to different values of the monitored signals. Blocks 770 and 870 are reached in the case wherein the ONU TX is malfunctioning, and thus requiring it to be shut down. Block 740 and 840 describe the condition in which it is determined that there is no malfunction. Block 780 indicates a process stop that leaves the ONU TX in shutdown condition indefinitely, until a restart (not shown) is made. In contrast, the iterative process in FIG. 10 depicts a continuing monitoring of the signals that causes the ONU TX's transmission to be restarted automatically once the malfunction is removed. It should be noted that though these flowcharts depict a specific order of steps, this is not to be construed as the only possible embodiments. The steps can be carried out in several orders, including concurrently. One of ordinary skill will know how these changes can be effected in any particular implementation of the present invention.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A passive optical network in which a plurality of optical network units (ONU) are optically connected to central office optical line termination (OLT) equipment for bi-directional data communications and the central office provides control specifying instruction, for each of the media access controller (MAC) contained within optical network units, said instructions defining time slices during which the optical network unit is authorized to transmit upstream data thereby meeting TDMA protocol, said optical network unit configured for automatic shutdown, comprising:
    a burst mode light source driver circuit contained within optical network units adapted to drive a light source in response to upstream data received at a digital data input, and further having said time slice frame delivered by said media access controller and shutdown inputs;
    a burst mode light source connected to said driver circuit and configured to generate an upstream optical signal having an upstream optical power level and representative of said upstream data received at said digital data input for transmission from said optical network unit to said central office optical line termination (OLT) equipment;
    an authorization circuit contained within optical network units responsive to said control to form an ON frame state signal during time slices in which transmission of said upstream optical signal from said optical network unit is authorized and an OFF frame state signal during time slices in which said transmission of said upstream optical signal is prohibited;
    a monitoring circuit contained within optical network units operable to monitor said burst mode light source upstream output optical power level;
    a comparison circuit contained within optical network units connected to said monitoring circuit and operable to compare said upstream optical output power level to a predetermined threshold power level and generate: (i) an ON monitor state signal while said upstream optical power level exceeds said predetermined threshold power level; and (ii) an OFF monitor state signal while said upstream optical power level is lower than said predetermined threshold power level; and
    a deactivation circuit contained within optical network units connected to said driver circuit and operable to detect the presence of said OFF monitor state signal indicative of a non functioning light source or low optical power output light source received from said comparison circuit in coincidence with presence of said ON frame state signal received from said authorization circuit and, in response, to output a shutdown signal;
    a deactivation circuit connected to said driver circuit and operable to detect the presence of said ON monitor state signal received from said comparison circuit in coincidence with presence of said OFF frame state signal received from said authorization circuit and, in response, to output a shutdown signal; and
    wherein said driver circuit is connected at said to frame state signal input and to shutdown signal from said deactivation circuit, and said driver circuit is configured to: (i) drive said light source to transmit said upstream data while said frame state signal is ON and said shutdown signal is not present; (ii) inhibit said light source while said frame state signal is OFF; and (iii) deactivate said light source upon receipt of said shutdown signal.

2. An optical network unit as recited by claim 1, wherein said optical network unit comprises a media access control system that provides said authorization circuitry.

3. An optical network unit as recited by claim 1, wherein said light source is a laser diode.

4. An optical network unit as recited by claim 1, wherein said light source is operable in burst mode.

5. An optical network unit as recited by claim 1, wherein said monitoring circuit comprises a photoresponsive circuit element optically coupled to said light source.

6. An optical network unit as recited by claim 5, wherein said monitoring circuit comprises a photodiode optically coupled to said light source.

7. An optical network unit as recited by claim 6, wherein said photodiode is series-connected with a load resistor coupled to said light source, such that a voltage drop across said load resistor is indicative of said upstream optical power level.

8. An optical network unit as recited by claim 7, further comprising a filter circuit element, such that said voltage drop is indicative of an average power level of said light source.

9. An optical network unit as recited by claim 1, wherein said filter circuit element produces a time constant longer than a turn-on time of said driver circuit.

10. An optical network unit as recited by claim 1, wherein said comparison circuit comprises a comparator having inputs connected to said load resistor and a voltage reference providing a preselected voltage indicative of said threshold power level.

11. An optical network unit as recited by claim 1, wherein said driver circuit is operable upon receipt of said shutdown signal to deactivate said light source by limiting a current supply thereto.

12. An optical network unit as recited by claim 1, wherein said driver circuit is operable upon receipt of said shutdown signal to deactivate said light source by interrupting power supplied thereto.

13. An optical network unit as recited by claim 1, wherein said deactivation circuit further comprises an output latching circuit configured to maintain said shutdown signal after said detection of said OFF monitor state signal in coincidence with said ON frame state signal.

14. In a passive optical network in which a plurality of optical network units (ONU) are optically connected to central office optical line termination (OLT) equipment for bi-directional data communications, each optical network unit being configured to transmit upstream optical data using a light source and to receive control from the central office optical line termination (OLT) equipment specifying instruction for time slices during which transmission of upstream data from said optical network unit is authorized, a method of deactivating a faulty optical network unit, comprising the steps of:

forming a frame state signal in response to said control, said frame state signal having an ON value during time slices in which transmission of upstream data from said optical network unit is authorized and an OFF value during time slices in which said transmission of upstream data is prohibited;

monitoring a power level of said upstream transmission with monitoring circuit having a photodiode optically coupled to said light source that measures a current flowing through the photodiode generating a voltage drop across a load resister, said voltage being indicative of said upstream power level;

comparing said voltage level to a predetermined threshold voltage-power level;

in response to detection of an upstream power level in excess of said threshold power level in coincidence with said frame state signal being in said OFF state, deactivating said light source, whereby said faulty optical network unit is deactivated and prevented from compromising the data integrity of said passive optical network PON.

15. A method as recited by claim 14, wherein said deactivating is continued as long as said upstream power level remains in excess of said threshold power level in coincidence with said frame state signal being in said OFF state.

16. A method as recited by claim 14, wherein said optical transmission remains deactivated after said detection until said faulty optical network unit is reset.

17. A method as recited by claim 14, wherein said monitoring circuit further comprises a filter circuit element having a time constant longer than a turn-on time of said driver circuit.

18. In a passive optical network in which a plurality of optical network units are optically connected to central office equipment for bi-directional data communications and the central office provides control specifying, for each of the optical network units, time slices during which the optical network unit is authorized to transmit upstream data, the improvement wherein at least one of said optical networking units is configured for automatic shutdown and comprises:

a driver circuit adapted to drive a light source in response to upstream data received at a digital data input, and further having frame and shutdown inputs;

a light source connected to said driver circuit and configured to generate an upstream optical signal having an upstream optical power level and representative of said upstream data received at said digital data input for transmission from said optical network unit to said central office equipment;

an authorization circuit responsive to said control to form an ON frame state signal during time slices in which transmission of said upstream optical signal from said optical network unit is authorized and an OFF frame state signal during time slices in which said transmission of said upstream optical signal is prohibited;

a monitoring circuit operable to monitor said upstream optical power level;

a comparison circuit connected to said monitoring circuit and operable to compare said upstream optical power level to a predetermined threshold power level and generate: (i) an ON monitor state signal while said upstream optical power level exceeds said predetermined threshold power level;

and (ii) an OFF monitor state signal while said upstream optical power level is lower than said predetermined threshold power level; and a deactivation circuit connected to said authorization and comparison circuits and operable to detect the presence of said OFF monitor state signal received from said comparison circuit in coincidence with presence of said ON frame state signal received from said authorization circuit and, in response, to output a shutdown signal; and wherein said driver circuit is connected at said frame input to said authorization circuit and at said shutdown input to said deactivation circuit, and said driver circuit is configured to: (i) drive said light source to transmit said upstream data while said frame state signal is ON and said shutdown signal is not present; (ii) inhibit said light source while said frame state signal is OFF; and (iii) deactivate said light source upon receipt of said shutdown signal.

* * * * *